United States Patent
Ward et al.

(10) Patent No.: US 6,945,230 B2
(45) Date of Patent: Sep. 20, 2005

(54) METHOD FOR ELIMINATING DETONATION IN AN ENGINE

(75) Inventors: Lance M. Ward, Lansing, MI (US); John D. Meaney, Hartland, MI (US)

(73) Assignee: TCI Automotive, LLC, Memphis, TN (US)

(*) Notice: Subject to any disclaimer, the term of this patent is extended or adjusted under 35 U.S.C. 154(b) by 0 days.

(21) Appl. No.: 10/181,260

(22) PCT Filed: Jan. 16, 2001

(86) PCT No.: PCT/US01/01449
§ 371 (c)(1),
(2), (4) Date: Aug. 28, 2003

(87) PCT Pub. No.: WO01/51808
PCT Pub. Date: Jul. 19, 2001

(65) Prior Publication Data
US 2004/0221835 A1 Nov. 11, 2004

(51) Int. Cl.⁷ ............................................... F02P 5/153
(52) U.S. Cl. .............................. 123/406.43; 123/406.41
(58) Field of Search ....................... 123/406.37, 406.38, 123/406.41, 406.43; 701/110, 115

(56) References Cited

U.S. PATENT DOCUMENTS

| | | | | |
|---|---|---|---|---|
| 5,063,902 A | * | 11/1991 | Inoue et al. | 123/406.41 |
| 5,682,856 A | * | 11/1997 | Tomisawa et al. | 123/406.43 |

* cited by examiner

Primary Examiner—Willis R. Wolfe, Jr.
(74) Attorney, Agent, or Firm—Clark Hill PLC

(57) ABSTRACT

A method eliminates detonation in an internal combustion engine (10) by identifying conditions that identify the imminence thereof. The method centers about the pressure inside the cylinder (16) of the internal combustion engine (10). The method tracks the pressure and when small rapid changes or fluctuations (38) in the pressure occur, the ignition timing is advanced for that particular cylinder (16). An alternative method utilizes a model of pressure based on an array of inputs and how the pressure should act based thereon. The method may also be used to maximize performance of the output of each cylinder (16) by retarding the ignition timing until the small fluctuations (38) appear. The ignition timing could immediately be advanced to prevent a detonation thus identifying a maximized output performance without reaching a detonation condition.

6 Claims, 4 Drawing Sheets

METHOD FOR ELIMINATING DETONATION IN AN ENGINE

BACKGROUND ART

1. Field of the Invention

The invention relates to detecting detonation in an internal combustion engine. More specifically, the invention relates to preventing detonation in an internal combustion engine by identifying conditions relating to detonation.

2. Description of the Related Art

Internal combustion engines used in motor vehicles require detonation detection. Detonation, more commonly referred to as "engine knock," is an event occurring in a cylinder of the motor vehicle wherein the fuel inside the cylinder is prematurely detonated. The result of the premature detonation is a loss of power and an increase of pollutants being released thereby.

OEM systems vary in how they detect and avoid detonation of the fuel. Regardless of the method used, they all have the advantage of incorporating the required technology directly into the internal combustion engine. For example, if a particular method requires a sensor to determine engine block vibrations, one could be installed as original equipment.

None of the systems know are capable of being implemented after market. More specifically, none of the systems are capable of being implemented because they are either environment specific, i.e., designed to a specific internal combustion engine, or they require technology that cannot be implemented after the manufacture and assembly of the internal combustion engine.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
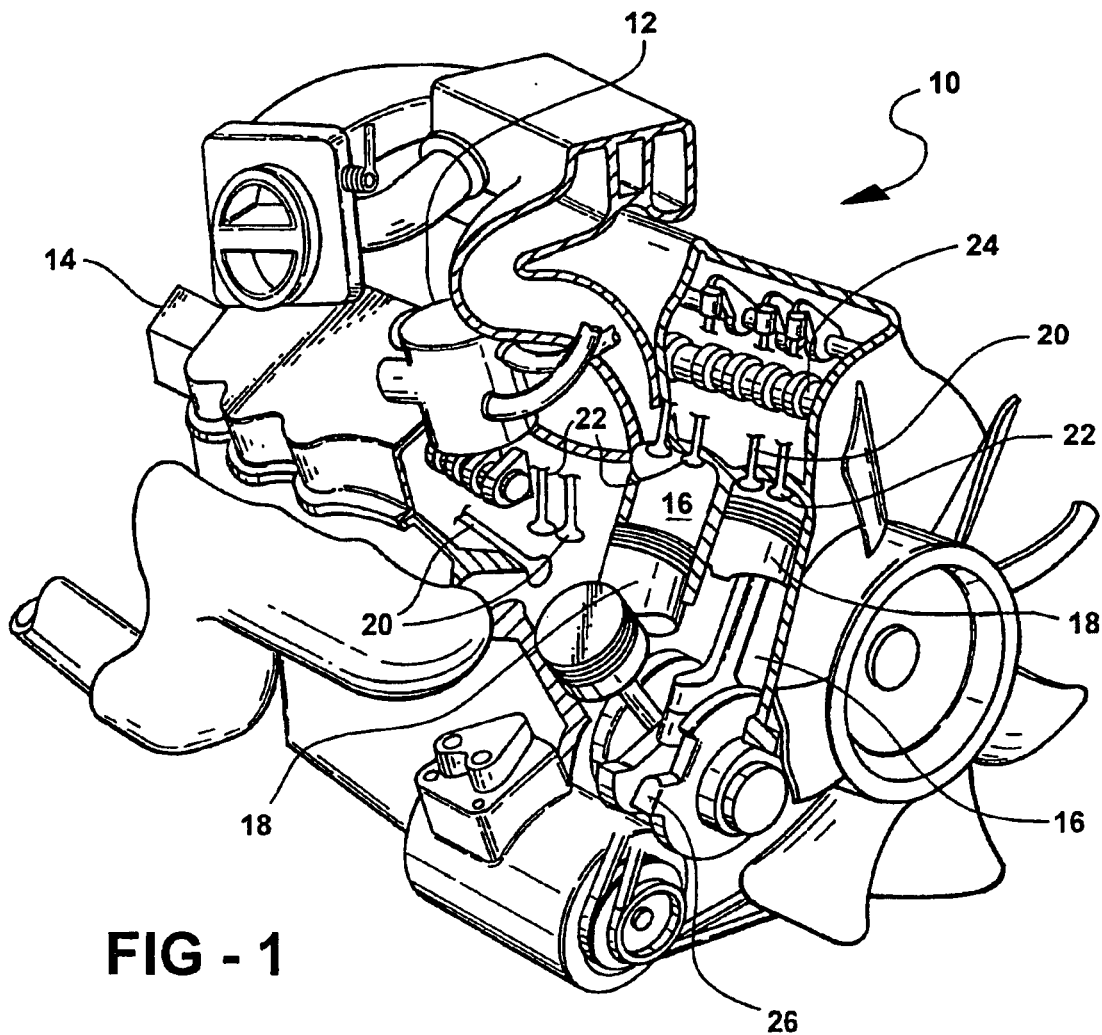
FIG. 1 is a perspective view partially cut away of an internal combustion engine incorporating one embodiment of the invention.

Referring to FIG. 1, a perspective view partially cut away of an engine for a motor vehicle is generally indicated at 10. The engine 10 is an internal combustion engine. The internal combustion engine 10 may include a distributor 12 or, in the alternative, it may include an electronic set up more appropriate for operation with an electronic fuel injector system (neither shown). The internal combustion engine 10 is controlled by an engine control unit 14. The engine control unit ("ECU") 14 provides all electrical and electronic communication between the various subsystems of the internal combustion engine 10 and other systems of the motor vehicle (none shown). The ECU 14 will be described in greater detail subsequently. The internal combustion engine 10 includes a plurality of cylinders 16, each having a piston 18 and at least one intake 20 and exhaust 22 valves. A camshaft 24 moves the valves 20, 22 and the pistons 18 move a crankshaft 26.

Figure 2:
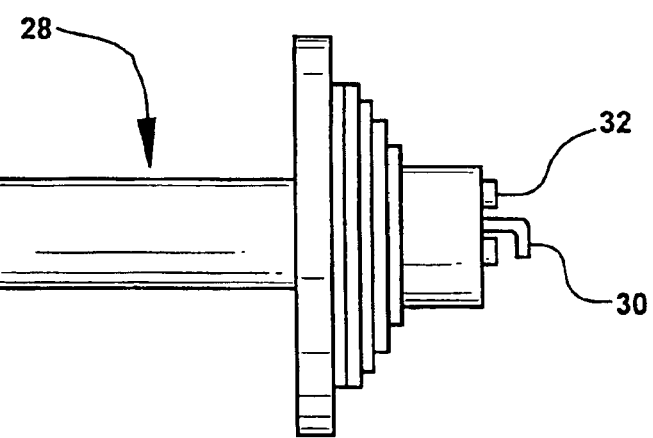
FIG. 2 is a side view of a spark plug.

Referring to FIG. 2, a spark plug is generally shown at 28. A spark plug 28 is mounted to the internal combustion engine 10 such that a spark end 30 thereof is exposed to the interior of one of the plurality of cylinders 16. At least one spark plug 28 is associated with each of the plurality of cylinders 16. The spark plug 28 provides a spark to ignite the fuel that has entered each of the cylinders 16 at a time dictated by the ECU 14 via the distributor 12.

The spark plug 28 also includes a transducer 32. The transducer 32 is disposed adjacent the spark end 30 of the spark plug 28. The transducer 32 is designed to measure the pressure of the gases in the cylinder 16 to which the spark plug 28 and transducer 32 are associated. The readings from the transducer 32 are transmitted to the ECU 14. It may be appreciated by those skilled in the art that the transducer 32 may be an independent device that would be secured to the interior of the cylinder 16 independently of the spark plug 28. The combination of the spark plug 28 and the transducer 32 is one merely of convenience as the port and current available to the spark plug 28 are suitable for the transducer 32.

Figure 3A:
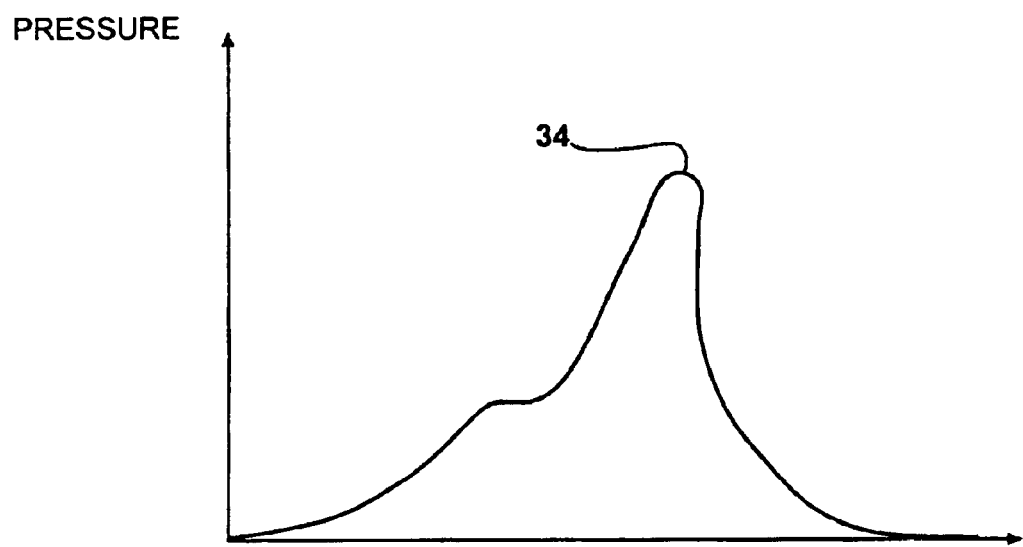
FIGS. 3A and 3B are graphs of cylinder torque generated by a cylinder of an internal combustion engine as a function of torque generation.

The ECU 14 reads the signals sent by the transducer 32. A typical reading is shown in the graph of FIG. 3A. The graph shows pressure to build within a cylinder 16 until ignition (shown at region 34), after which the pressure drops off as the piston 18 is forced away from its too dead center position. This graph represents a normal ignition event in a cylinder 16 as a function of the torque generated by that cylinder 16. In one embodiment, the mean effective pressure is measured.

Figure 3B:
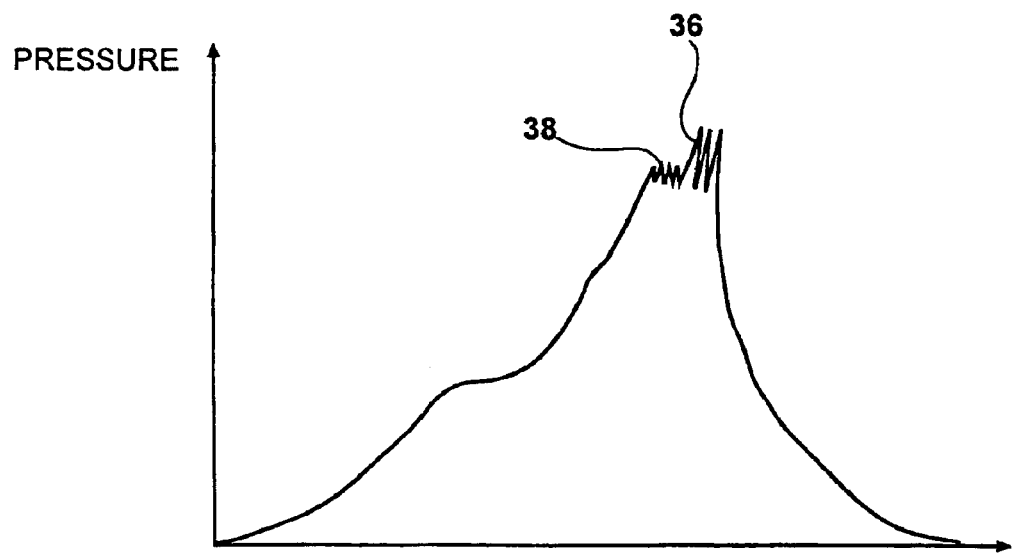

Referring to FIG. 3B, the pressure graph is shown when a detonation occurs prior to any ignition in a particular cylinder 16. Detonation is the combustion of the fuel prior to the time at which it is supposed to be ignited. A detonation destroys all ability for a cylinder 16 to generate power. A large fluctuation 36 occurs near region 34 of FIG. 3A representing a detonation. These large fluctuations 36 may vary greatly in amplitude greatly. Therefore, the large fluctuations 36 shown in FIG. 3B are shown having an amplitude that is merely an example amplitude. Immediately preceding the large fluctuation in pressure is a region 38 of small fluctuation. This region 38 is sometimes referred to as a small fuzzy region.

The method of the invention uses the signal from the transducer 32 to determine whether the region 38 of small fluctuation exists. If so, it can then be determined that detonation will occur shortly thereafter along the pressure curve. If the region 38 of small fluctuations is detected, the ignition timing can be retarded to avoid the occurrence of the detonation. This method is therefore capable of detecting when each of the plurality of cylinders 16 is approaching detonation. Timing for each of the plurality of cylinders 16 can then be individually advanced or retarded depending on the pressure detection.

Figure 4:
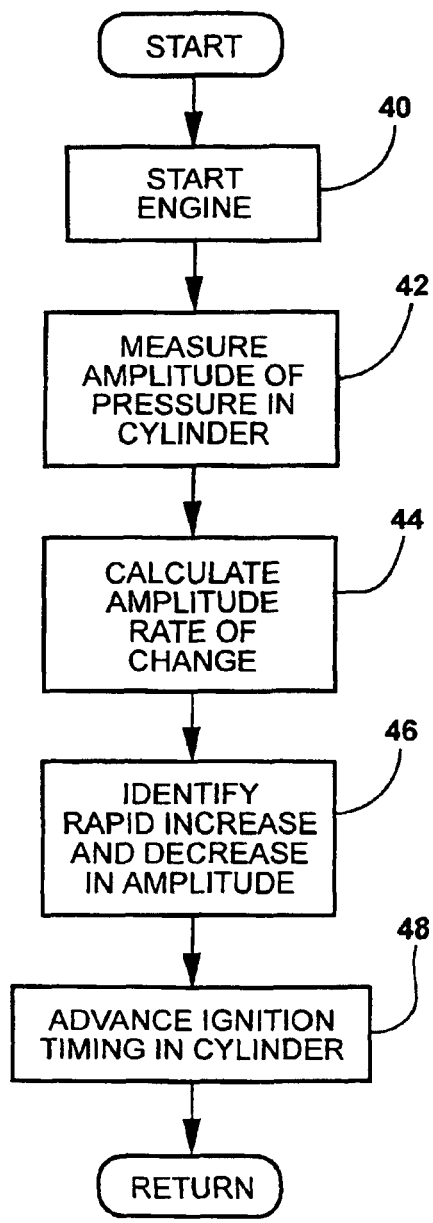
FIG. 4 is a logic flow chart of one method according to the invention.

More specifically, and with reference to FIG. 4, the method includes the step of starting and operating the internal combustion 10 at 40. The amplitude of pressure within a cylinder 16 is measured. In the preferred embodiment, the pressure in each of the cylinders 16 of the internal combustion engine 10 is measured. Amplitude is measured over time and the rate of change is calculated at 44.

To determine whether detonation is to occur in a cylinder 16, the ECU 14 constantly reviews the rate of amplitude of pressure to identify when the rate increases or decreases rapidly. This step, performed at 46, is used to identify when small fluctuations in the amplitude 38 occur. This region of small fluctuations 38 is the precursor to detonation, region 36 of large fluctuations in pressure amplitude. Once identified, the ignition timing is advanced allowing the internal combustion engine 10 to avoid detonation in that particular cylinder 16.

Figure 5:
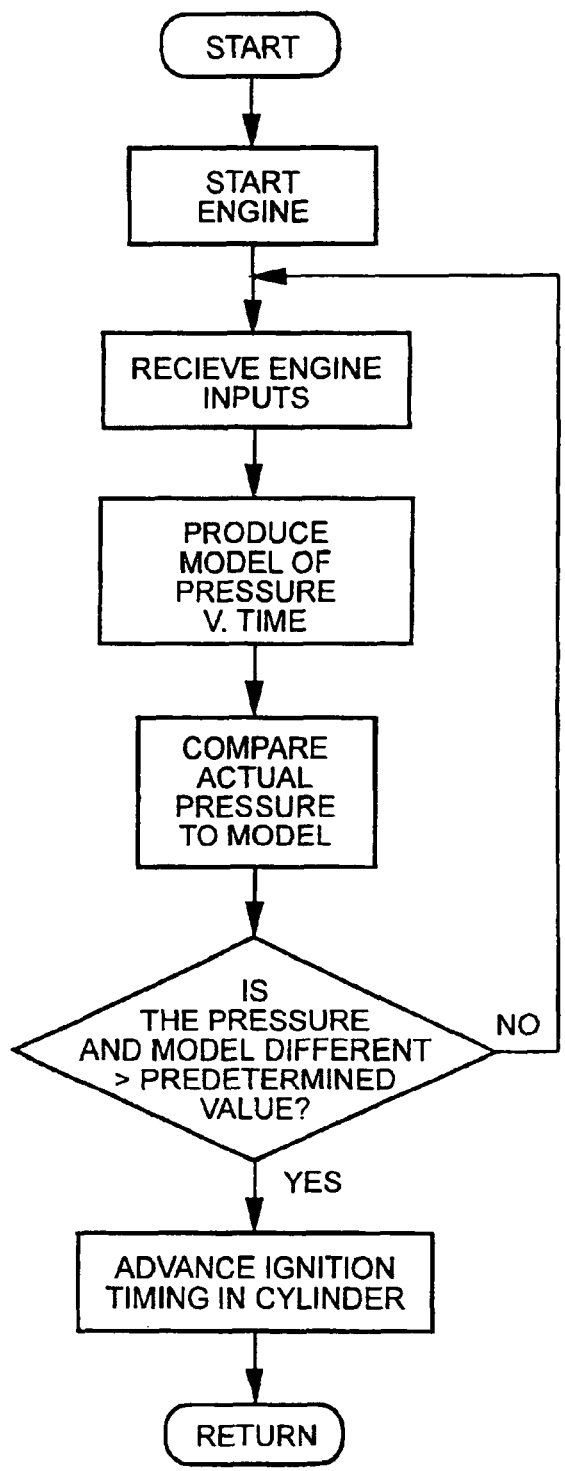
FIG. 5 is a logic flow chart of an alternative method according to the invention.

In an alternative embodiment shown in FIG. 5, differences are measured against a model of how pressures within the cylinder 16 are to act given certain parameters. If the difference at any time exceeds a particular value for a particular time, the ignition timing would be advanced to avoid a detonation. In this embodiment, the model may be merely the values illustrated in FIG. 3A. Conversely, the model may be more elaborate and require inputs from various elements of the motor vehicle. By way of example and to be in no way interpreted as limiting, the torque output and the revolutions per minute of the internal combustion engine 10 are two inputs that could affect how the model would operate.

Figure 6:
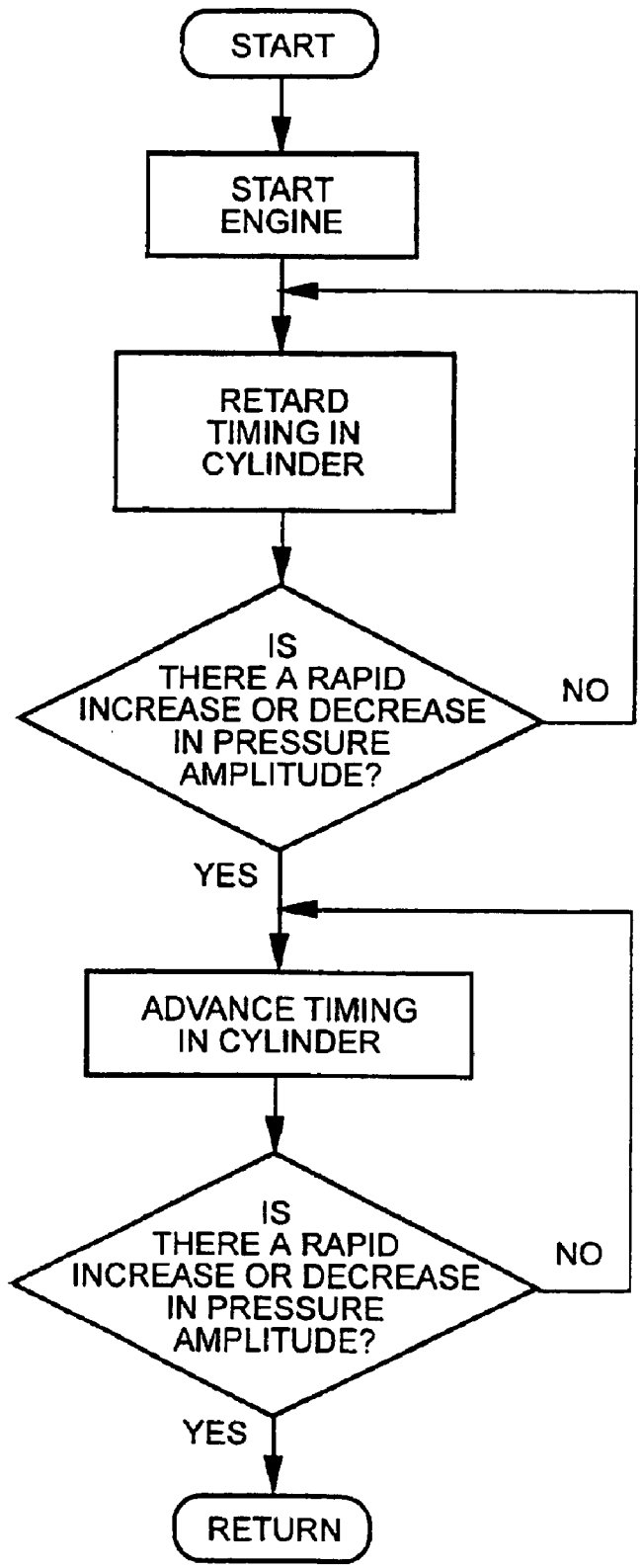
FIG. 6 is a logic flow chart of a second alternative method according to the invention.

An added feature of the method for detecting detonation for the prevention thereof is the ability to retard the ignition timing of an internal combustion engine 10 until the region of small fluctuations 38 appears. As shown in FIG. 6, it will be at this point that the maximum amount of performance may be extracted from the internal combustion engine 10 without generating a detonation. Once the small fluctuations 38 are detected, the ignition timing is advanced slightly to prevent detonation from occurring.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A method for preventing detonation of fuel within a cylinder of an internal combustion engine wherein the cylinder includes a spark plug operating on an ignition timing, a port and a pressure transducer accessing the cylinder via the port, the method comprising the steps of:
   operating the internal combustion engine;
   measuring the amplitude of pressure within the cylinder as a function of time;
   calculating a rate of pressure change;
   identifying a region of pressure change increases and decreases that occur rapidly; and
   advancing the ignition timing of the fuel within the cylinder to avoid detonation.

2. A method as set forth in claim 1 including the step of measuring the amplitude of pressure change between a peak and a valley in the amplitude of pressure measurement.

3. A method as set forth in claim 2 including the step of recording an occurrence of small fluctuations when the rate of pressure amplitude is identified as changing rapidly.

4. A method as set forth in claim 3 including the step of recording an occurrence of detonation when the rate of pressure amplitude is identified as changing rapidly and when the amplitude of pressure between peak and valley is greater than a predetermined value.

5. A method for optimizing performance of an internal combustion engine having at least one cylinder wherein the cylinder includes a spark plug operating on an ignition timing, a port and a pressure transducer accessing the cylinder via the port, the method comprising the steps of:
   operating the internal combustion engine;
   measuring the amplitude of pressure within the cylinder as a function of time;
   calculating a rate of pressure change;
   retarding the ignition timing of the fuel within the cylinder;
   identifying a region of pressure change increases and decreases that occur rapidly; and
   stopping the step of retarding the ignition timing when the rate of pressure change increases or decreases rapidly.

6. A method as set forth in claim 5 including the step of advancing the ignition timing a predetermined angle after the step of stopping to ensure detonation does not occur.

* * * * *